Figure 1:
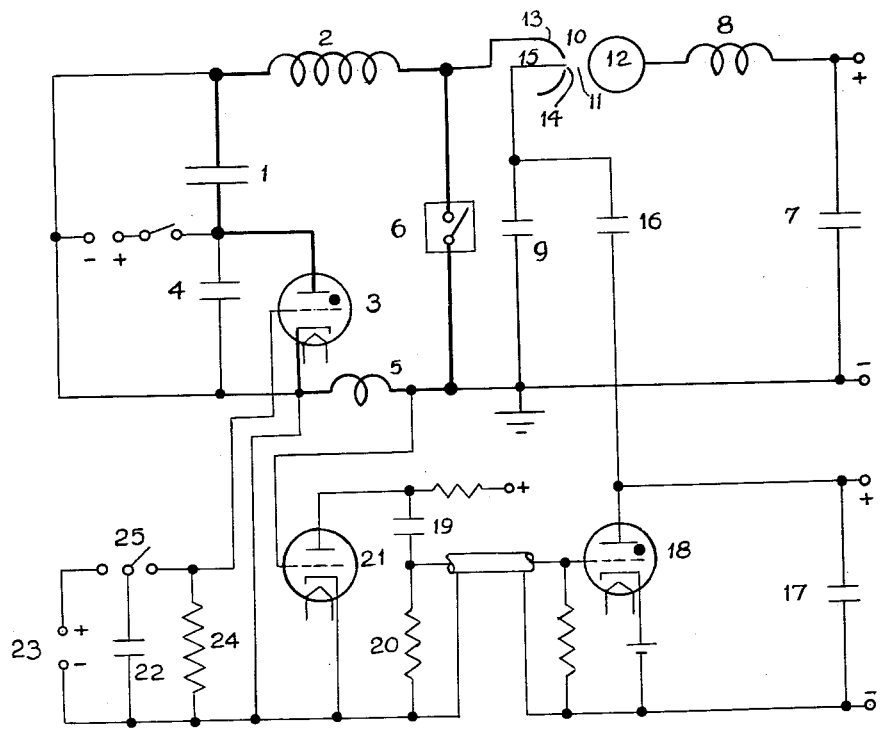

INVENTOR
Mohamed M. Khalifa.

United States Patent Office

3,021,476
Patented Feb. 13, 1962

1

3,021,476
TESTING CIRCUIT FOR CIRCUIT BREAKERS
Mohamed M. Khalifa, Cairo, Egypt
Filed June 11, 1956, Ser. No. 590,784
3 Claims. (Cl. 324—28)

My invention relates to arrangements used for testing of circuit breakers, and more particularly to circuit arrangements used for synthetic testing of alternating current circuit breakers of the type which can interrupt their arc currents at the first passage through zero value. Such circuit breakers are now in public use and are of different forms such as vacuum circuit breakers, air-blast circuit breakers and the circuit breakers which use sulphur hexafluoride as the arc-interrupting ambient.

The object of my invention is to synthetically provide a circuit breaker of the aforesaid type with the conditions that usually occur when the circuit breaker of the said type interrupts the alternating current flowing through the same. The test of the circuit breaker using the present circuit arrangement is said to be synthetic because the high current needed to flow through the circuit breaker during the test and the high voltage needed to be applied across the said circuit breaker after the same interrupts the said current are applied from two separate sources. Such principle is known to result in reducing the capital to be invested in the testing arrangement. One advantage of my present testing circuit arrangement is further economy because both of the current source and voltage source of my arrangement are energized from low power supplies.

My invented circuit provides the circuit breaker to be tested with only one current impulse of the form of a half-cycle of an alternating current followed by only one high voltage impulse thus imposing the same stresses upon the circuit breaker of the above said type as those stresses usually imposed on the same when interrupting currents in the power networks.

An object of the present invention is to provide a testing circuit arrangement for testing the alternating-current circuit breakers which can interrupt their arcs at the first zero value, using a source of one high-current impulse to flow through said circuit breaker; together with a source of one high voltage impulse to be applied across said circuit breaker; and an electronic timing circuit which sensitively synchronizes the high voltage impulse with the end of the high current impulse.

Another object of the present invention is to provide a testing circuit arrangement for the circuit breakers of the above said type, which circuit is composed of an impulse voltage source of a definite polarity connected in parallel with the circuit breaker to be tested; an impulse current source of a prescribed polarity which can be charged from a low-current supply and is connected in series with said circuit breaker in order to feed the same by a high current impulse of a prescribed polarity; and a device sensitive to the natural as well as the forced interruption of said current impulse to release said high voltage impulse at the end of said high current impulse.

A further object of the present invention is to provide a testing circuit for circuit breakers using one high voltage impulse source, a sensitive synchronizing device and a high current impulse source having inherent protection against high voltages.

A further object of the present invention is to provide

2 a testing circuit for alternating current circuit breakers, which circuit is composed of one source of a unidirectional high current impulse of a prescribed polarity, one generator of a high voltage high frequency surge of a predetermined polarity and a synchronizing device sensitive to normal and to sudden cessation of the current output of the said impulse high current source for releasing said high voltage surge exactly at the end of said high current impulse.

My invention will be more fully set forth in the following description referring to the accompanying drawing, and the features of novelty which characterize my invention will be pointed out with particularity in the claims annexed to and forming a part of the present specification.

Figure 2:
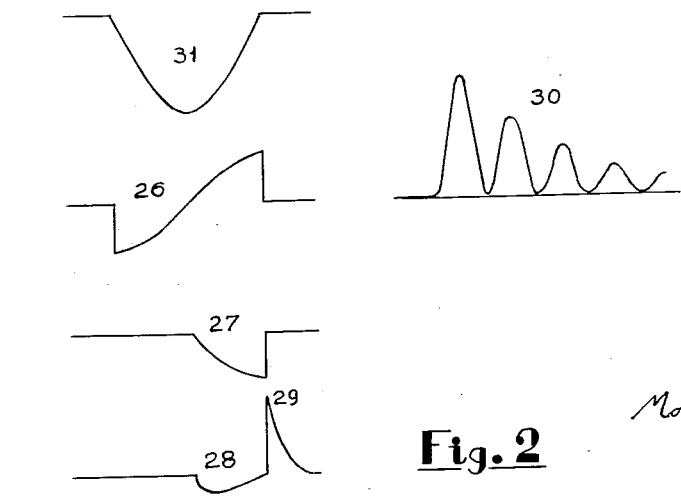

The accompanying drawing in FIGURE 1 shows by way of example one form of the connection diagram of my invented circuit arrangement and FIGURE 2 illustrates the current impulse shape and the voltage wave shapes at the different points of the invented circuit.

The present testing circuit comprises, in addition to the circuit breaker under test 6, the impulse high current source composed of the capacitors 1 and 4, the main inductance coil 2, the pickup coil 5 and the thyratron 3; the impulse high voltage source composed of the capacitor 7, the tuning coil 8, the load capacitor 9; and the synchronizing circuit composed of the hard vacuum amplifier tube 21, the capacitor 19, the resistance 20, the thyratron 18, and the capacitors 16 and 17. Each of said high-current and high voltage source is connected between the two terminals of the circuit breaker to be tested 6.

The components of the present testing circuit arrangement will be described in more detail hereinafter so as to clarify the inter-relations among the different elements of the testing circuit arrangement.

The testing circuit has the current source composed of an inductance coil 2 having one terminal connected to one terminal of the circuit breaker under test 6, the other terminal of the said coil 2 is connected to one terminal of a capacitor 1 of which the other terminal is connected to one terminal of a capacitor 4. The other terminal of the capacitor 4 is connected to one terminal of a pickup coil 5 of which the other terminal is connected to the free terminal of the circuit breaker under test 6. The anode of a thyratron tube 3 is connected to the common point of connection of the capacitors 1 and 4, while the cathode of the said thyratron 3 is connected to the common point of connection of the capacitor 4 and the pickup coil 5. Thus, the capacitor 4 is shunted by thyratron 3. The control electrode of the thyratron tube 3 is connected to one terminal of the resistance 24 and also to one of two fixed contacts of the double-throw switch 25. The other fixed contact of the said switch is connected to one terminal of a direct current source 23, while the moving contact of the said switch 25 is connected to one terminal of a capacitor 22. The free terminals of the capacitor 22, of the supply 23 and of the resistance 24 are connected to the cathode of the thyratron tube 3 of the impulse current source. Thus, if the capacitor 22 is charged from the supply 23, and then it is discharged through the resistance 24 by means of the double-throw switch 25, a voltage pulse would be applied to the control electrode of the thyratron 3 causing it to conduct, and the high current impulse output of the current source would be released as will be described below.

The high voltage impulse source of the present testing circuit is one surge generator composed of the capacitor 7 connected in series with a tuning coil 8; the free terminal of the coil 8 is connected to the sphere electrode 12 of the ordinary 3-electrode trigatron spark-gap 10, and the free terminal of the capacitor 7 is connected in common with one terminal of the load capacitor 9 and with the point of connection of the circuit breaker under test 6 and the pickup coil 5. The free terminal of the capacitor 9 is connected in common with one terminal of the capacitor 16 and the igniting rod electrode 15 of the said spark-gap 10. The third electrode 13 of the said spark-gap 10 is connected to the point of connection of the circuit breaker 6 and the coil 2.

The above said capacitor 16 forms a component of the synchronizing circuit. The free terminal of the capacitor 16 is connected in common to the anode of the thyratron 18 and to one terminal of the capacitor 17, which capacitor is to be charged from a direct current source of a suitable voltage. The point of connection of the pickup coil 5 with the circuit breaker under test 6 is connected to the grid of the hard-vacuum amplifier tube 21 of which the anode is connected to one terminal of a capacitor 19 of which the other terminal is connected to one terminal of the resistance 20, and to the control electrode of the thyratron 18.

The common point of connection of said capacitor 4, said coil 5, and the cathode of said thyratron 3 is connected to the common point of connection of said capacitor 22, said supply 23 and said resistance 24. The same point is also connected to the cathode of said tube 21, the free terminal of said resistance 20, the cathode of said thyratron 18 and the free terminal of the abovesaid capacitor 17.

The performance of my testing circuit arrangement is to let a high current impulse, similar in shape to a halfcycle of power supply current, of a predetermined polarity flow from the abovesaid current source through the abovesaid circuit breaker under test which will automatically open forming an arc. At the instant of interruption of the said high current impulse, a high voltage impulse of the general form of recovery voltages of power systems and of a predetermined polarity is applied from the above high voltage source across the circuit breaker under test. The above said synchronizing circuit releases the high voltage impulse to be applied across the circuit breaker 6 at the instant the said current impulse ends.

The performance of each element of the testing circuit arrangement to achieve the abovesaid test procedure is described in detail hereinafter.

To prepare for the test of the circuit breaker 6, it is closed so that the current can flow through it. The capacitors 1 and 4 are charged to the required polarity from a conventional low-current direct current supply of a suitable voltage higher than the arc voltage of the circuit breaker 6. Also, the capacitor 7 of the voltage source is charged from a low-power high-voltage direct current supply of the conventional type to the required polarity, and to the required voltage. The main gap 11 of the spark gap 10 is set to break down at a slightly higher voltage than the charging voltage of the capacitor 7. The capacitor 17 is charged to a voltage suitable for breaking down the auxiliary gap 14 of said spark gap 10. Also, the capacitor 22 is connected through the switch 25 to the supply 23.

For testing the circuit breaker 6, the capacitor 22 is connected through the switch 25 to the resistance 24, and the voltage that thus appears across said resistance 24 will trigger the thyratron 3 through which the capacitors 1 and 4 will be discharged. The current flowing from the capacitor 1 through the coil 2, the circuit breaker 6 and the coil 5 will tend to have an oscillatory shape with a frequency decided by the magnitudes of the capacitance 1 and the inductances 2 and 5; but due to the unidirectional characteristic of the thyratron 3, this said current will be limited to an impulse of the form of one halfcycle with the natural frequency of the abovesaid oscillatory circuit, as shown by the trace 31 in FIGURE 2. The present type of current source is novel in the field of testing arrangements for circuit breakers.

When the said current impulse flows through the circuit breaker 6, the latter opens automatically to interrupt the said current at or near and before the end of the impulse 31. The whole current 31 flows through the pickup coil 5 because no conducting impedance branch is connected in parallel with the same coil, and the instant of interruption of the current 31 through the circuit breaker 6 under test will be the instant of interruption of the same current through the pickup coil 5. Accordingly, the end of the voltage wave 26 (induced across the coil 5 by the flow of the current wave 31 through the same coil) corresponds to the instant of interruption of the said current by the circuit breaker under test 6. The said voltage wave 26 being fed to the grid of amplifier tube 21 and its anode output will be as traced at 27 of FIGURE 2. The performance of the amplifier tube is well known. The voltage wave 27 being applied across the series connection of the capacitor 19 and the resistor 20, has its end corresponding to the end of the voltage wave 26 which in turn corresponds to the instant of interruption of the said current impulse 31 through the circuit breaker under test 6. Due to the well known phenomenon that the current through a capacitance is proportional to the time rate of change of the voltage across the same, the voltage across the resistance 20 will take the form 28, FIGURE 2, when the voltage wave 27 is imposed across the capacitor 19 and the resistance 20 in series with each other. The positive peak 29 of the voltage pulse 28 occurs at the end of the voltage wave 27, which instant is the end of the voltage wave 26 and is the instant of current interruption through the circuit breaker 6, as stated above. The voltage peak 29 is formed even if the said current impulse 31 is not forced to end before its natural instant of interruption, that is, even if it is not forced to come to a sudden cessation. This novel feature of obtaining the voltage peak 29 exactly at the end of the current impulse through the circuit breaker under test without the said current having to cease suddenly is due to the fact that the whole said current flows through the pickup coil 5, as no conducting branch is connected in parallel with the said coil.

The positive peak voltage 29 is imposed on the control electrode of the thyratron 18 and triggers the same thyratron. The capacitor 17 thus discharges causing a high voltage pulse to flow through the coupling capacitor 16 to igniting electrode 15 to break down the auxiliary gap 14 of the spark gap 10. The ionization produced by the breakdown of the gap 14 causes the main gap 11 to break down, thus connecting the charged capacitor 7 and the coil 8 to the capacitor 9 which is in parallel with the circuit breaker under test 6 at the instant of interruption of said current impulse.

Due to the oscillatory circuit composed of the coil 8 and the capacitors 7 and 9, a high voltage high frequency impulse of the form 30 will occur across the capacitor 9 and thus across the circuit breaker 6, which impulse is similar in shape to normal recovery voltages and is of a polarity predetermined by the polarity of the charging voltage of the capacitor 7.

During the period of flow of the high current impulse, no conducting branch is connected in parallel with the circuit breaker under test 6 and the whole current flows through the same. Also, during the period of application of the high voltage impulse across the said circuit breaker, the said high voltage surge is applied across the coil 2 in series with the capacitors 1 and 4. As the impedance of the coil 2 approaches the impedance of the capacitor 1 at their resonant frequency corresponding to the duration of the current impulse 31, the impedance value of the coil 2 becomes much greater than the impedance value of the capacitors 1 and 4 at the much higher frequencies corresponding to the voltage impulse 30. Therefore, the major fraction of the said high voltage impulse would appear across the coil 2 while a small fraction would appear across the capacitors 1 and 4 which are thus protected against high voltage, and the thyratron 3 is also protected for the same reason. Also, as the capacitance of the capacitor 17 is chosen much greater than the capacitance of the capacitor 16, only a small fraction of the high voltage impulse would appear across the capacitor 17, and the capacitor 19, the resistance 20 and the thyratron 18 as well as the tube 21 are thus protected against high voltage from the high voltage surge generator mentioned above. Also, the inductance of the pickup coil 5 is chosen much smaller than the inductance of the coil 2 and the fraction of the high voltage impulse that appears across the coil 5 is thus very small. Thus, the high current source of the present testing circuit has consistent inherent protection against high voltage from the high voltage source without needing protective gaps or protective circuit breakers which are well known to be inconsistent.

In case of alternating current circuit breakers which can interrupt their arcs at the first zero value, if a steady-state continuously alternating high current is applied to one of the said circuit breakers from a conventional source, and it is intended to interrupt the said current, the contacts of the said breaker would separate and the arc thus formed would last for a period not exceeding half a cycle. Therefore, to test such a type of circuit breaker, only one half cycle of the high current should suffice. Thus, a high current impulse of the shape of a half-cycle and of a prescribed polarity would be more suitable for the test; and the expensive conventional current source of large current rating would be of no value, and the present current source charged from a D.C. supply of very low current rating would be more economical and more appropriate. The present current source stores the charge from the low-current direct current supply at a long period; and during the test, it releases the charge over a very short duration in the form of a high current impulse. The present current source has a further advantage over conventional alternating current sources that the output of the present source has a prescribed polarity, and thus only one high voltage impulse of a predetermined polarity is needed to be applied at the end of the current impulse, rather than a series of high voltage impulses to be applied at the current zero values of the alternating current from conventional sources in conventional testing arrangements. Thus, only one high voltage surge generator is needed in the present testing circuit arrangement.

These and other novel features of the present invention will be particularly pointed out in the claims annexed hereto.

It will be obvious to those skilled in the art that the thyratrons 3 and 18 in my circuit can be replaced by similar gas-discharge tubes comprising cathodes, anodes and control electrodes which perform in a similar manner as the thyratron. Such tubes are well known and are available on the market. It will be also obvious to those skilled in the art that the amplifier tube 21 in my circuit can be a hard vacuum triode or can be replaced by any amplifying device which can perform in a similar manner as the hard-vacuum triode. It is also clear that the trigatron gap 10 in my circuit can be replaced by a similar 3-electrode spark gap.

What I claim as new and desire to secure by Letters Patent of the United States is:

1. In a testing circuit for alternating current circuit breakers; two terminals between which the circuit breaker to be tested is to be connected; a generator of a high voltage high frequency surge with a prescribed polarity connected between said two terminals; a source of a unidirectional high current impulse of a prescribed polarity, composed of one inductance coil connected between one of said two terminals and a capacitor, and a pickup inductance coil connected between the other of said two terminals and another capacitor, a gas discharge tube connected in shunt with said other capacitor, said two capacitors being connected in series, a low-current direct-current supply and means for charging said capacitors from said supply, means for initiating conduction of said gas discharge tube whereby said capacitors discharge through said coils and said tube to cause flow of said unidirectional high current impulse through said circuit breaker, said one inductance coil isolating said capacitors from said high voltage high frequency output; and means for releasing said high voltage surge from said generator at the instant of natural or forced interruption of said high current impulse.

2. In a testing circuit for circuit breakers, in combination; two terminals between which the circuit breaker to be tested is to be connected; a source of a high current unidirectional impulse of a prescribed polarity, composed of two capacitors connected in series with each other, a low-current direct-current supply and means for charging said two capacitors from said supply, an inductance coil connected between one of said two terminals and one of said two capacitors, a pickup inductance coil connected between the other of said two terminals and the other of said two capacitors, thus forming an oscillatory circuit, a gas discharge tube connected in shunt with said other capacitor, said tube intended to allow when conducting, the flow of current through said oscillatory circuit in only one direction, means for initiating conduction of said tube whereby said two capacitors discharge through said coils and said tube to cause flow of said high current impulse through said circuit breaker, said pickup inductance coil inducing a voltage wave across the same during flow of said high current impulse; a high voltage surge generator connected between said two terminals for applying a high voltage surge across said circuit breaker, a spark gap with a triggering electrode included in said surge generator for releasing said surge from said generator when a voltage pulse is fed to said triggering electrode; means for feeding said voltage pulse to said triggering electrode at the instant of natural or forced interruption of said high current impulse, composed of an amplifier with input terminals and output terminals, said input terminals being connected across said pickup inductance coil so as to be fed by said voltage wave induced across said pickup coil, a capacitor and a resistor connected in series with each other across said output terminals of said amplifier for producing a voltage peak across said resistor at the end of said voltage wave, another gas discharge tube with a control electrode, another capacitor connected across said other gas discharge tube, another low-current direct-current supply and means for charging said other capacitor from said other supply, said control electrode being connected to said resistor whereby said voltage peak is fed to said control electrode to start conduction of said other gas discharge tube and thus said other capacitor discharges through said other tube producing a voltage pulse across said other tube, a coupling capacitor connected between said other tube and said triggering electrode of said spark gap for transmitting said voltage pulse to said triggering electrode.

3. In a testing circuit for circuit breakers, in combination; two terminals between which the circuit breaker to be tested is to be connected; a source of a high current unidirectional impulse of a prescribed polarity composed of two capacitors connected in series with each other, an inductance coil connected between one of said two terminals and one of said two capacitors, a pickup inductance coil connected between the other of said two terminals and the other of said two capacitors, a low-current direct-current supply and means for charging said two capacitors from said supply, a gas discharge tube connected in shunt with said other capacitor intended to limit the flow of said high current impulse in only one direction, means for initiating conduction of said gas discharge tube whereby said capacitors discharge through said coils and said tube to cause flow of said high current unidirectional impulse through said circuit breaker, said pickup coil inducing a voltage wave across the same during the flow of said high current impulse; a generator of a high voltage surge connected between said two terminals for applying a high voltage surge across said circuit breaker, a three-electrode spark gap included in said generator, means for causing breakdown of said spark gap at the instant of interruption of said high current impulse by use of said voltage wave thus said high voltage surge generator being connected to said circuit breaker and said surge being applied across said circuit breaker.

References Cited in the file of this patent

UNITED STATES PATENTS

| | | |
|---|---|---|
| 2,104,629 | Willheim et al. | Jan. 4, 1938 |
| 2,120,873 | Skeats | June 14, 1938 |
| 2,866,154 | Herbst | Dec. 23, 1958 |
| 2,888,639 | Petermichl | May 26, 1959 |
| 2,898,548 | Slamecka | Aug. 4, 1959 |

FOREIGN PATENTS

| | | |
|---|---|---|
| 823,370 | France | Oct. 11, 1937 |